United States Patent [19]

Whitaker et al.

[11] Patent Number: 4,500,045
[45] Date of Patent: Feb. 19, 1985

[54] LATERALLY TRANSLATABLE ROLL APPARATUS

[75] Inventors: Angus H. Whitaker, Monte Sereno; Keith E. McFarland, Woodside; William A. Lloyd, Los Altos; Willard J. Patrick, Los Gatos, all of Calif.

[73] Assignee: Xerox Corporation, Stamford, Conn.

[21] Appl. No.: 526,939

[22] Filed: Aug. 29, 1983

[51] Int. Cl.³ .............................................. B65H 25/26
[52] U.S. Cl. ..................................... 242/57.1; 226/20
[58] Field of Search ................... 242/57.1; 226/24, 19, 226/20; 464/169, 162, 157; 192/67 R

[56] References Cited

U.S. PATENT DOCUMENTS

| | | | |
|---|---|---|---|
| 1,945,981 | 2/1934 | Quinby | 242/57.1 |
| 2,566,399 | 9/1951 | Bishop | 101/248 |
| 2,672,198 | 3/1954 | Jones | 242/57.1 |
| 2,672,299 | 3/1954 | Jones | 242/57.1 |
| 3,069,056 | 12/1962 | Richards et al. | 242/57.1 X |
| 3,317,101 | 5/1967 | Himrod et al. | 242/57.1 X |
| 3,568,904 | 8/1969 | Kurz | 226/15 |
| 3,701,318 | 10/1972 | Lozeau et al. | 101/336 |
| 3,774,271 | 11/1973 | Depuy et al. | 226/15 X |
| 4,021,031 | 5/1977 | Meihofer et al. | 226/20 |
| 4,054,251 | 10/1977 | Henderson et al. | 226/15 X |

FOREIGN PATENT DOCUMENTS 2334600 8/1977 France .

*Primary Examiner*—Stuart S. Levy
*Assistant Examiner*—Leo J. Peters
*Attorney, Agent, or Firm*—W. Douglas Carothers, Jr.

[57] ABSTRACT

A roll apparatus for supporting a continuous web of material is designed to maintain the web in proper alignment as the web is paid from or rewound onto the roll. The apparatus comprises a pair of frame members to rotatably support the roll on a pair of open ended bearing supports. A roll drive has a drive shaft extending to one end of the roll. An interengageable coupler is provided on both the output end of the roll drive shaft and the one end of the roll to permit the roll to be rotatably driven by the roll drive shaft while not being directly secured thereto. This allows for immediate lateral disengagement of the coupler means upon removal of the other end of the roll from its open ended bearing support. A spring loaded plunger is axially mounted at the one end of the roll and biased to move axially outward away from the roll for engagement against the output end of the drive shaft. A lateral translation drive is mounted on the other of the frame members with a lateral translation output mechanism engaging in axially aligned, abutting contact relation with the other end of the roll. This arrangement permits disengagement of the other end of the roll from the lateral translation output mechanism by lifting the other roll end out of its open ended bearing support together with lateral disengagement of the one roll end from the interengageable coupler.

12 Claims, 8 Drawing Figures

LATERALLY TRANSLATABLE ROLL APPARATUS

RELATED APPLICATIONS

U.S. application Ser. No. 444,144, filed Nov. 24, 1982 and entitled COLOR ELECTROGRAPHIC RECORDING APPARATUS and assigned to the assignee herein.

U.S. application Ser. No. 444,143, filed Nov. 24, 1982 and entitled WEB TRACKING SYSTEM and assigned to the assignee herein.

BACKGROUND OF THE INVENTION

The instant invention relates to the art of lateral translation of a supply or take-up roll of a continuous web of material to maintain the roll in proper alignment as the material is paid from the roll for some form of treatment or rewound onto the roll to be paid from the roll again in an aligned manner for further treatment of the web.

The invention has application to electrographic recording systems for forming electrostatic latent images on a continuous web of material comprising a recording medium and is particularly applicable to the color electrographic art and electrographic apparatus for consecutively forming a plurality of latent component images on a recording medium from a supply roll to a take-up roll in the apparatus, which component images are sequentially developed with a respective color developer or toner and which images must be superimposed to produce a composite color image on the recording medium.

Commercially successful electrographic apparatus in the past has involved one recording station and one development station with one toning medium, which is usually black. In recent years there has been increasing pressure on electrographic system vendors to create and develop reliable color electrographic systems. This is particularly true because of the increased application of color CAD/CAM system usage and color LSI/VLSI design mandating the use of color display and design and, consequently, requiring color hardcopy output.

Going from single color to multiple color electrographic recording, a complex problem is encountered. In single color recording, the latent image is formed followed by its immediate development. However, in color recording, two or more latent images must be independently formed and developed and superimposed upon one another. Thus, some means of registration is mandatory to insure that the different color component images are sufficiently superimposed to prevent color fringes and color errors and provide a high resolution color print useful in the above-mentioned applications. Part of such a registration means would be to correct for inconsistency of the length of the core in which the medium is rolled. This inconsistency is compensated for by lateral adjustment of the supply roll and/or take-up roll for the recording medium to insure that the medium is properly aligned for treatment as it is paid from the roll. The other part of such registration means is the weave pattern of the medium length which is compensated by electrographic head adjustment which is the subject of the previously identified patent application Ser. No. 444,144.

SUMMARY OF THE INVENTION

According to this invention, a laterally translatable roll apparatus supporting a continuous web of material, albeit for supply or take-up, is designed to maintain the roll in proper alignment as the web is paid from or rewound onto the roll. The apparatus comprises a pair of frame members to rotatably support the roll therebetween. A roll drive means has a drive shaft extending to one end of the roll. An interengagable coupler means is provided on both the output end of the roll drive shaft and the one end of the roll to permit the roll to be rotatably driven by the roll drive shaft while not being directly secured thereto. Means is axially mounted at the one end of the roll and biased to move axially outward away from the roll for engagement against the output end of the drive shaft. This axially mounted biased means may comprise a spring loaded plunger mounted in one end of the roll.

Lateral translation drive means is mounted on the other of the frame members with translation output means engaging but not secured to the other end of the roll. Circuit means controls the lateral translation drive means to laterally translate the lateral output means which results in lateral translation of the roll without interfering with the rotational operation of the roll via the roll drive means. The lateral translation drive means may comprise a stepper motor mounted on the other frame member with its drive shaft in axial alignment with the rotational axis of the roll to apply translatory motion to the roll via the translation output means.

The circuit means is connected to the stepper motor to drive the stepper motor in either direction based upon signals derived from two inputs supplied to the circuit means. An optical edge sensor is mounted at the edge of the web as the same is paid from the roll and is productive of a voltage signal indicative of the amount of coverage of the sensor by the edge of the web. The voltage signal output of the sensor is one of the inputs to the circuit means. A voltage reference source provides a voltage reference signal representative of the desired lateral position of the web as the same is paid from or rewound onto the roll. The voltage reference signal is the other of the inputs to the circuit means. Comparator means in the circuit means compares the inputs and produces a signal indicative of the amount of incremental steps to be taken by the stepper motor. Also, the circuit determines the correct rate of application of the incremental steps to be taken by the stepper motor to be in synchronism with the then velocity or rate of movement of the recording medium.

One application for the laterally translatable roll apparatus is lateral translation of a recording medium roll in an electrographic printing or plotter system as the recording medium is paid from or rewound onto a medium roll in cooperation with its take-up and pay out from a medium take-up roll to properly align the medium for desired aligned movement through one or more stations comprising such a system.

Other objects and attainments together with a fuller understanding of the invention will become apparent and appreciated by referring to the following description and claims taken in conjunction with the accompanying drawings.

DETAIL DESCRIPTION OF PREFERRED EMBODIMENT

Figure 1:
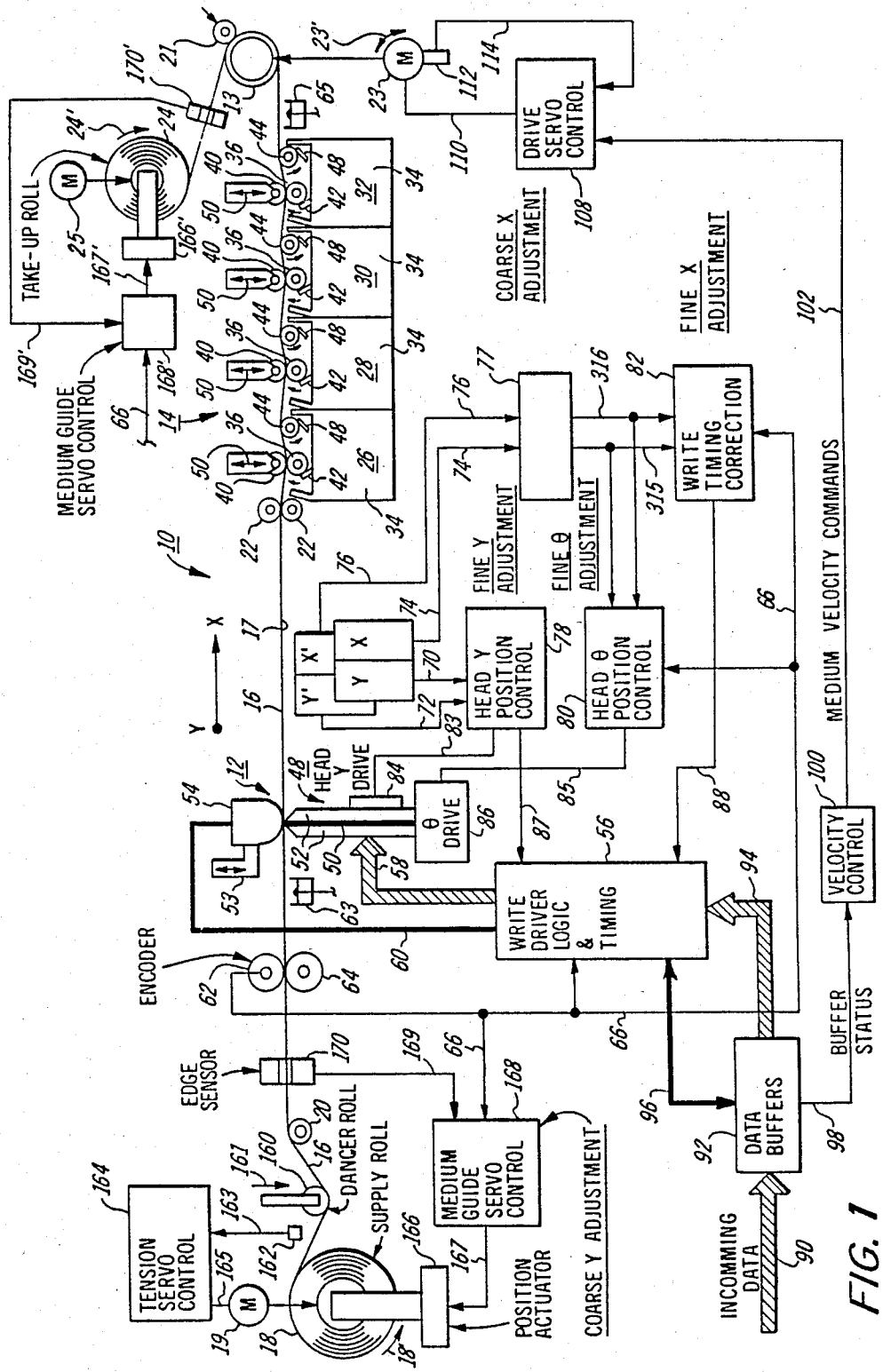
FIG. 1 is a schematic diagram showing a color electrographic apparatus to illustrate the application of the instant invention.
Figure 2:
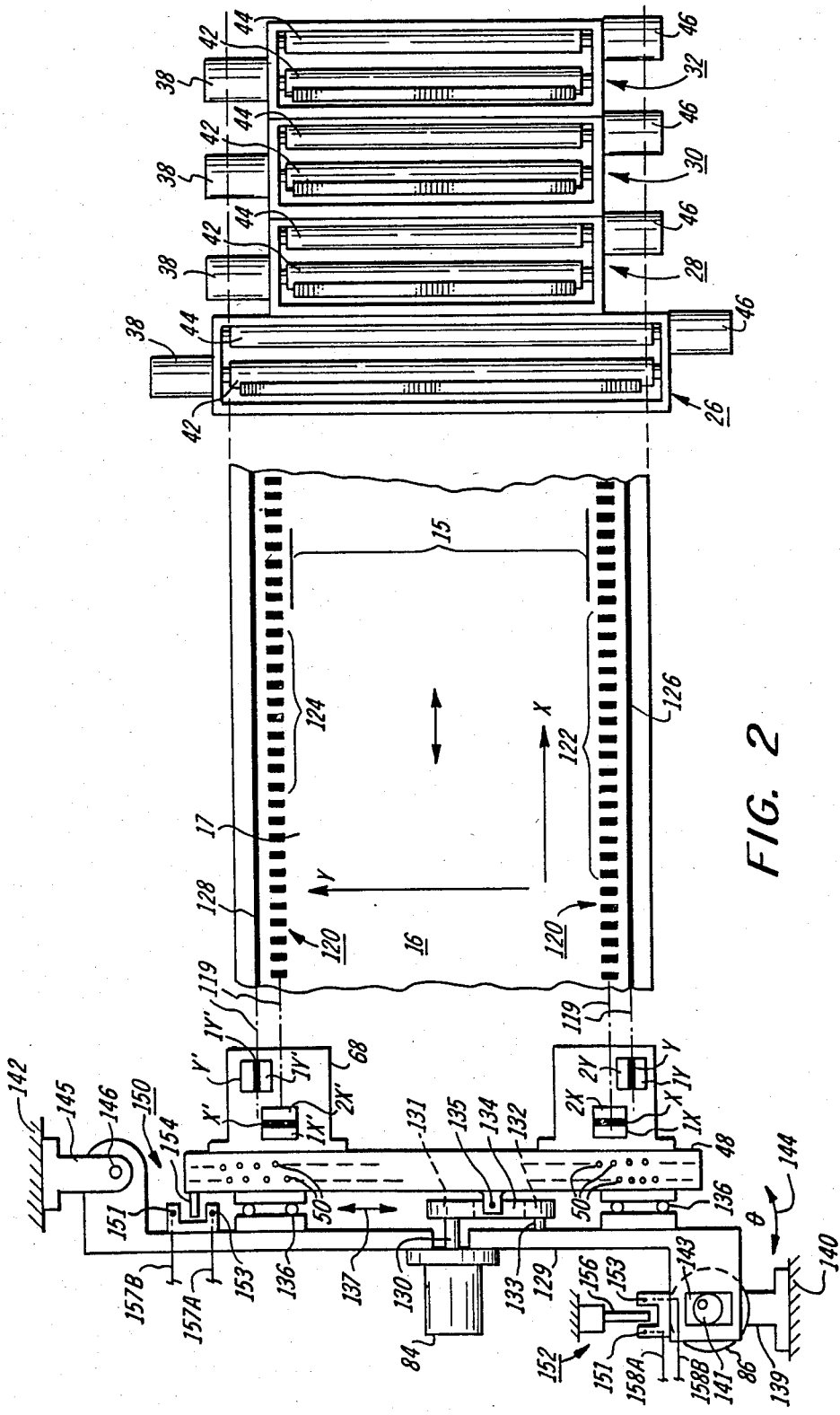
FIG. 2 is a schematic diagram showing a plan view of a portion of the recording medium path for the color electrographic apparatus shown in FIG. 1.

In order to appreciate how the instant invention may be utilized in a particular application, reference is first made to a color electrographic apparatus 10 shown in FIGS. 1 and 2 in which the laterally translatable roll apparatus of the instant invention may be employed. Apparatus 10 comprises a recording station 12 and developing means 14 adjacent to station 12. Both station 12 and developing means 14 are aligned in the path of a continuous web of material in the form of recording medium 16. Recording medium 16 is drawn from supply roll 18 in the X direction over a series of rolls in the bed of apparatus 10, by means of drive roll 13 driven by drive motor 23. Only some of these rolls are shown at 20 and 22 for the purposes of simplicity. Rollers 21, e.g., two rollers in tandem, are provided to ride against drive roll 13 in order to provide a firm grip on the medium 16. The medium 16 is taken up on take-up roll 24 by take-up motor 25.

Supply roll 18 is also provided with a drive motor 19 to rewind the paid out recording medium 16 back onto supply roll 18 for further processing by apparatus 10. The drive motor circuitry for rolls 18 and 24 is not shown, as such medium handling is conventional in the continuous web handling art involving the manufacturing, coating, utulizing (e.g., reel to reel recording tape transport) and other processing of continuous web material. Basically, supply roll motor 19 is continuously applying a driving force in the direction of arrow 18' while take up motor 25 is continuously applying drive in the direction of arrow 24'. These oppositely opposed drives maintain medium 16 in a state of equilibrium until drive motor 23 is enabled in either direction, as indicated by arrow 23', either to drive the medium 16 forward at a relatively slow rate for processing by apparatus 10 or to drive the medium 16 rearward at a relatively fast rate to wind the medium 16 back onto supply roll 18.

Developing means 14 comprises a series of applicator roll type liquid development fountains 26, 28, 30 and 32 each of identical design. The fountains 26–32 are the subject matter of patent application Ser. No. 517,158 U.S. Pat. No. 4,454,833 and are described only in general detail here. Other types of developing fountains may be employed in appartatus 10. For example, a dry toner system may be employed similar to that disclosed in U.S. Pat. No. 4,121,888. Also, the vacuum type liquid development fountain disclosed in U.S. Pat. No. 4,289,092 is suitable for use in apparatus 10, except that it is preferred that the individual vacuum fountains be selectively brought into engagement with and withdrawn away from the surface 17 of medium to be developed. Another liquid development system that may be employed is disclosed in the 8000-F Series Electrographic Film Plotter Operating Manual, Volume 1, published in 1981 and available from Versatec, Inc. of Santa Clara, Calif.

Referring to both FIGS. 1 and 2, each of the fountains 26–32 comprises a liquid toner container 34 within which is partly submerged the toner applicator roll 36. A portion of the side of the container 34 for each fountain is shown broken away in FIG. 1 in order to illustrate the relative relationship of the components comprising the fountain structures. Toner container 34 is provided with an inlet and outlet for replenishing the supply of liquid toner in a manner illustrated in U.S. Pat. No. 4,289,092. Roll 36 is rotated at high rotational velocity, e.g., 750 rpm with clockwise rotation when viewing FIG. 1, by means of motor 38 (FIG. 2). The high rotational velocity provides a sheath of liquid toner in a development gap between roll 36 and its backup roll 40. Resilient doctor blade 42 wipes roll 36 clean of excess toner and also aids in preventing toner buildup on its surface.

Just beyond the applicator roll 36 in each fountain is a drying roll 44. Drying roll 44 is rotated by means of motor 46 (FIG. 2) at a higher rotational velocity than applicator roll 36, e.g., 1200 rpm with counterclockwise rotation when viewing FIG. 1. Roll 44 removes excess toner from medium surface 16 as well as providing a drying action to its surface. Resilient doctor blade 48 is applied against roll 44 to wipe the excess toner from its surface.

The arrows 50 on the backup rolls 40 represent the withdrawal of this roll when a particular fountain is not in use so that recording medium 16 will pass over the fountain out of engagement with the applicator roll 42. For this purpose, the axis of drying roll 44 is at a higher vertical elevation than the axis of the applicator roll 42. If a particular backup roll 40 is in its retracted position, the medium surface 17 will not be in contact with the corresponding applicator roll 42 and will move over above this roll in contact with rolls 22 and 44. The movement 50 of the backup roll 40 may be accomplished, for example, by hydraulic lifters (not shown).

Each fountain 26–32 is provided with a particular liquid toner color component. For example, fountain 26 may contain black liquid toner, fountain 28 may contain magenta liquid toner, fountain 30 contains cyan liquid toner and fountain 32 may contain yellow liquid toner. Fountain 26 containing black liquid toner and is longer in length than the other three fountains 28–32 as illustrated in FIG. 2. Fountain 26 is capable of toning recording medium surface 17 from one edge to the other while the other fountains 28–32 are only capable of toning the region 15 which is the general field for the deposit of component latent images on surface 17 of the recording medium.

Reference is now made to the recording station 12, which is described only in general detail. Station 12 comprises a recording or writing head 48 having one or more aligned rows of writing stylus electrodes 50 supported in a dielectric support 52. Oppositely opposed but in alignment with the electrodes 50 is an aligned row of backup electrodes 54. An example of such an electode means 50/54 is disclosed in U.S. Pat. Nos. 4,042,939 and 4,315,270. Writing electrodes 50 are electrically coupled to write driver logic and timing circuit 56 by means of conductor harness 58 while backup electrodes 54 are electrically coupled to circuit 56 by means of a group of conductors 60.

It will be apparent to those skilled in the art that other electrode arrangements for station 12 may be used with apparatus 10. For example, the writing electrode with adjacent complementary electrodes disclosed in U.S. Pat. No. 3,653,065 may be employed in lieu of the arrangement shown in FIG. 1.

Since apparatus 10 provides for medium 16 to be rewound rapidly onto supply roll 18, it is desired that a pneumatic, hydraulic or electormechanical lift 53 be provide for the backplate assembly of backup electrodes 54. Electrodes 54 are lifted up out of position and away from the writing electrodes 50 when writing is not occuring and the medium is in the fast rewind mode.

Encoder 62, backed by roller 64, is adapted to run with the moving medium and may be positioned at any convenient location along the medium path through apparatus 10. The output of encoder 62 is supplied to write driver logic and timing circuit 56 via line 66 as well as write time adjustment circuit 86 and head $\theta$ position control circuit 80. Encoder 62 provides a series of pulses per revolution, each pulse representative of an incremental distance of medium movement.

Incoming data for application by circuit 56 to electrode means 50/54 is supplied from a host computer at input 90 to data buffers 92. Buffers 92 represent various buffer delay logic for the purpose of holding two or more lines of data to be presented to the writing electrodes 50 under the control of circuitry 56. The output of buffers 92 is presented on bus 94 to circuit 56. Circuit 56 includes circuitry for data buffer control via lines 96, write timing, high voltage supply, writing electrode (nib) drivers, backup electrode (backplate) drivers. The operation of this circuitry and the details concerning the circuit logic as well as the overall system control can be found in the 8000 F Series Electrographic Film Plotter Operating Manual, Volumes 1 and 2, published in 1981 and available from Versatec, Inc. of Santa Clara, Calif.

The output line 98 from the data buffers 92 is a signal that represents the buffer states, i.e., whether or not the buffers are filled with incoming plot data. This status is supplied as an input to velocity control circuit 100 which, based upon buffer status, supplies medium velocity and direction commands to drive servo control 108 via line 102. Drive servo control 108, in turn, drives and controls the speed and direction of drive motor 23 via line 110. Control 108 maintains precise motor speed by utilizing a speed servo loop including tachometer 112, the output of which is connected to control 108 via line 114. Details of the operation and logic circuitry for drive servo control 108 is disclosed in the above mentioned 8000 F Series Operating Manual, Volumes 1 and 2.

Drive servo control 108 drives motor 23 dependent on the rate of incoming data to be presented to the writing electrodes 50. As such, this control is termed coarse X adjustment in providing a plurality of different forward medium velocities based upon the amount and status of data available for presentation via circuitry 56 to writing electrodes 50 and forming deposited scan lines of data on medium 16 upon sequential operation of the series of backup electrodes 54 as the medium is stepped forward in a manner well known in the art and disclosed in Volumes 1 and 2 of the 8000F Series Operating Manual, supra.

As shown in FIGS. 1 and 2, pairs of photosensors X, Y, X', & Y' are positioned adjacent to the medium 16 between the recording station 12 and the developing means 14. These photosensors are actually pairs of photodiodes coupled at their cathode to a source of positive bias. Photosensor X comprises photodiodes 1X and 2X, photosensor X' comprises photodiodes 1X' and 2X', photosensor Y comprises photodiodes 1Y and 2Y and photosensor Y' comprises photodiodes 1Y' and 2Y'. These photosensors need not be positioned at the "down stream" side of recording station 12 as shown in FIG. 1. They may also be positioned at the "up stream" side between encoder 62 and recording station 12. While their position adjacent either side of station 12 is acceptable, it is preferred that they be in close proximity to station 12 in order to fundamentally be corrective of of medium dimensional changes occurring in the medium in close proximity to head 48 at any given time.

Photosensors X, Y, X', & Y' also each include their own light source directed toward the medium surface 17. However, photosensors X, Y and photosensors X', Y' may share a single light source. In any case, the light sources are not shown in the Figures.

As shown in FIG. 2, the photosensors X, Y, X' and Y' are physically mounted on a frame 68 upon which is mounted the writing head 48. The photosensors are positioned beneath the surface 17 of medium 16 in a manner to be substantially aligned with the tracking indicia 120, as indicated by dotted lines 119. Tracking indicia 120 comprises a series of edge tracking marks 122 and 124 and two tracking lines 126 and 128. Sensor X is in a position to sense tracking marks 122. Sensor Y is in a position to sense tracking line 126, sensor X' is in a position to sense tracking marks 124 and sensor Y' is in a position to sense tracking line 128. As the surface 17 of medium is drawn over the head 48 and writing electrodes 50, the sensors X, X', Y and Y' and connected signal processing circuitry can monitor the indicia and utilize the information for various machine functions, such as, lateral or Y direction positioning of the head 48, angular rotation or theta ($\theta$) positioning of the head 48 along the Y axis of medium 16.

As shown in FIG. 1, sensors Y and Y' have their respective outputs 70 and 72 connected to head Y position control 78. Sensors X and X' have their respective outputs on lines 74 and 76 connected to circuit 77 comprising initial signal processing circuitry for the X and X' sensors (FIG. 12) and start plot logic circuit 282 (FIG. 13). The X and X' processed signals are respectively placed on output lines 315 and 316 from circuit 77 to head $\theta$ position control 80 and to write timing correction 82. Head Y position control 78 has an output 83 connected to Y stepper drive motor 84 and a second output 87 connected to the write driver logic and timing circuitry 56. Head $\theta$ position control 80 has an output 85 connected to head $\theta$ stepper drive motor 86. Write timing correction 82 has an output 88 connected to the write driver logic and timing circuitry 56.

As shown best in FIG. 2, Y drive servo motor 84 is mounted on frame 129 and has a drive shaft 130 coupled to a sprocket 131. A corresponding idler sprocket 132 is mounted to rotate on shaft 133 secured to frame 129. Sprockets 131 and 132 are linked together by the band or belt 134. Band 134 is secured by arm 135 to frame 68. Head frame 68 is mounted via bearing supports 136 to move laterally or in Y direction relative to frame 129. It can be seen that frame 68 with head 48 will move in either Y direction, as indicated by arrow 137, in response to step movements by servo motor 84 via lateral movement of band 134 connected to frame 68.

Head $\theta$ drive servo motor 86 is supported from machine side frame 140 and has an eccentric 141 supported on the end of its shaft, as illustrated in FIG. 2. Eccentric 141 is positioned in a slot 143 in one end of frame 129. This frame end is supported from side frame 140 by means of support 139 for $\theta$ movement as indicated by arrow 144 upon rotation of eccentric 141.

The other end of frame 129 is pivotally mounted from support 145 secured to the machine side frame 142. The point of pivot for $\theta$ movement 144 is at 146. It can be seen that frame 129, along with frame 68, will move about pivot point 146, as indicated by arrow 144, in response to step movements by servo motor 86 via rotational movement to eccentric 141 in slot 143.

Both frames 68 and 129 are provided with optical limit switch devices 150 and 152 indicative of the maximum limits of thir respective directional movement in opposite directions. Limit switch devices 150 and 152 comprise pairs of optical sensors and light sources indicated at 151 and 153 for each device. The path of light from the source to the sensor is broken by the passage of a respective flag 154 and 156 indicating that a maximum limit has been reached. Each sensor/light pair 151 and 153 has two output lines representing opposite maximum limits; for device 150 these are lines 157A and 157B and for device 152 these are lines 158A and 158B.

Referring again to FIG. 1, adjacent to the payout of medium 16 from supply roll 18 is dancer roll 160, which is supported in a conventional manner to provide predetermined level of bias on medium 16 indicated by arrow 161. Means 162 is provided to monitor the applied predetermined tension on dancer roll 160. Means 162 may be an optical sensor positioned to determine relative vertical movement of dancer roll 160. On the other hand, means 162 may be an electrical sensor to determine such movement. Means 162 is connected by line 163 to tension servo control 164. Control 164, which includes a motor drive control (not shown), is coupled via line 165 to supply roll motor 19.

The function of dancer roll 160 is to ensure that a predetermined amount of tension is applied to medium 16 as it is paid off of supply roll 18. The servo control 164 can monitor changes in the desired tension and either increase or decrease the back torque on motor 19, as the case may be, for correcting to the desired level of medium tension.

Between recording station 12 and encoder 62 is a corotron 63 that extends the width of medium 16 in the Y direction. Also, there is shown in FIG. 1 a similar corotron 65 between fountain 32 and drive roll 13. Corotrons 63 and 65 aid in the removal of residual charge from the medium surface 17 by applying a charge of opposite polarity to that provided by writing electrodes 50. In this manner a new latent component image may be formed at recording station 12 without any interference from previously deposited electrostatic charge from the creation of the previous image forming pass of the same medium section through station 12. Either one corotron or both corotrons 63 and 65 may be employed to perform this function.

Reference should be made to the previously identified patent applications Ser. Nos. 444,144 and 444,143 for further information relative to color electrographic apparatus 10.

Coarse Y adjustment for medium 16 is the subject of the instant invention. Coarse Y adjustment is lateral adjustment of medium position relative to head 48 and is achieved by a supply roll position actuator 166 shown in further detail in FIGS. 3, 4 and 5. The actuator 166 includes a stepper servo motor which receives input from the medium guide servo control 168 via supply lines 167 to move the supply roll 18 laterally in either Y direction. An optical edge sensor 170 monitors the edge of medium 16 and supplies an input signal via line 169 to guide servo control 168 indicative of which direction the supply roll 18 should be laterally moved for medium alignment upon pay out or rewind. A take-up roll position actuator 166' is also shown in FIG. 1 for take-up roll 24. Actuator 166' is identical to actuator 166. Like actuator 166, actuator 166' includes a stepper servo motor which receives input from the medium guide servo control 168' via supply lines 167' to move the take-up roll 24 laterally in either Y direction. Optical edge sensor 170' between drive roll 13 and take-up roll 24 monitors the edge of medium 16 and supplies an input signal via line 169' to guide servo control 168' indicative of which direction the take-up roll 24 should be laterally moved for medium alignment up take-up or pay out (rewind).

Since both of these adjustment systems and their actuators 166 and 166' are indentical, for the sake of simplicity, detailed reference will be made only to the adjustment system in connection with supply roll 18, the explanation thereof being fully applicable to the adjustment system for take-up roll 24.

Figure 3:
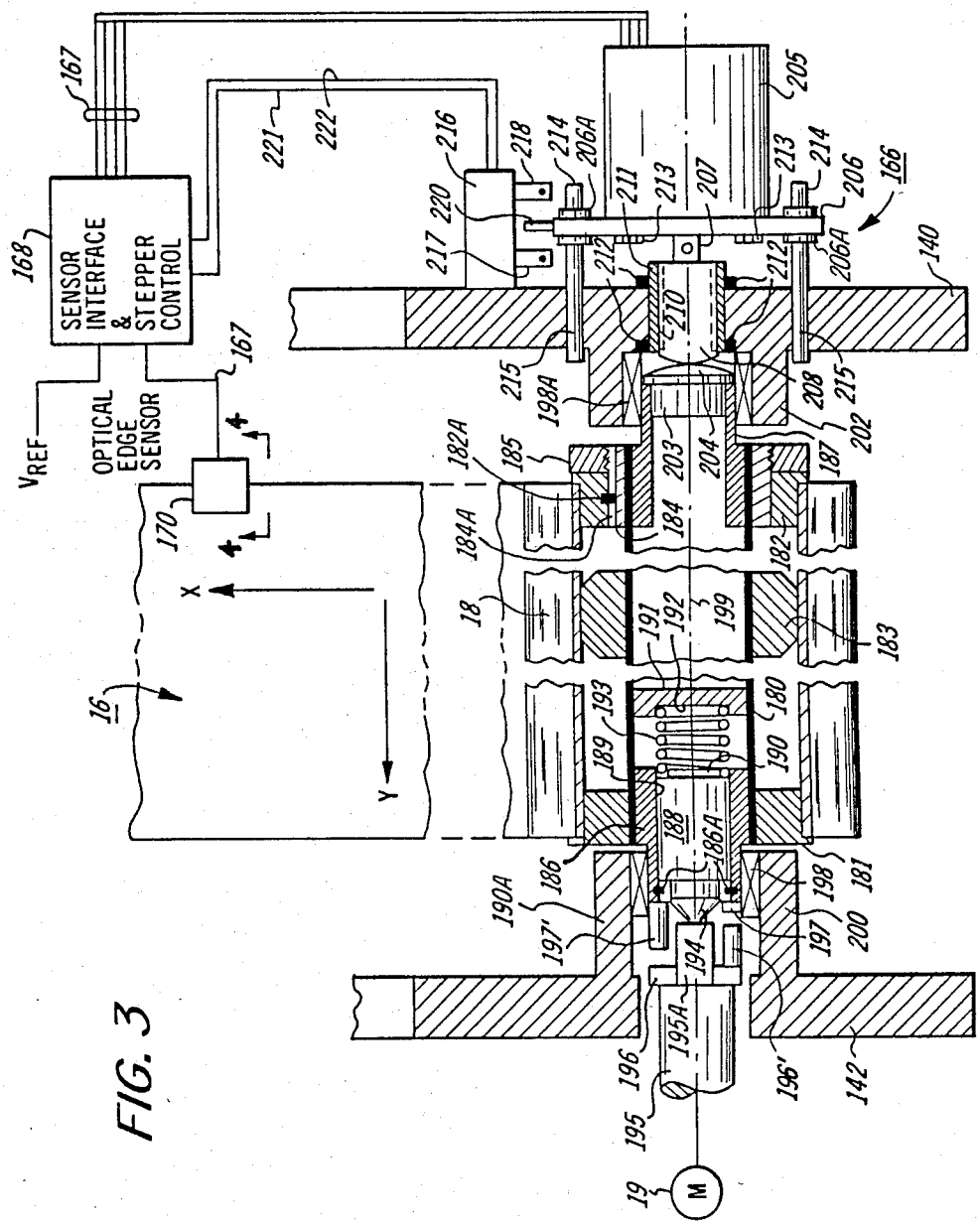
FIG. 3 is a schematic diagram of the instant invention comprising drive means for lateral translation of the recording medium roll for the apparatus shown in FIG. 1.

With particular reference now to FIG. 3, supply roll 18 is rotatably supported in side frames 140 and 142 of apparatus 10 on a structure comprising roll tube 180 having end roll stops 181 and 182. Stops 181 and 182 support roll 18 on tube 180 with the aid of a centrally located roll spacer 183. Roll stop 181 is secured to tube 180 while stop 182 is removable. An externally threaded collar 184 is secured to the end of tube 180 opposite to stop 181. Once roll 18 is slipped over tube 180 and spacer 183 with its end in engagement with stop 181, the removable stop 182 is slipped over collar 184, which collar is fixed to roll tube 180. Stop 182 is held in fixed relation relative to collar 184 by means of the pin 182A of stop 182 which is aligned in key or slot 184A of collar 184. By means of roll nut 185 threaded upon collar 184, the assembly of the end of roll tube 180, stop 182 and collar 184 are maintained in fixed relation. In this manner, supply roll 18 is held secured to roll tube 180.

Left and right ends of roll tube 180 are provided with a respective bearing support member 186 and 187. The end of bearing support member 187 is provided with a plug member 203 having a spherical end surface 204.

Member 186 has a cylindrical passage 189 within which is slidably mounted the roll thrust plunger 188. The rearward extent of plunger 188 is provided with a circular projection 190.

Mounted internally within the confines of tube 180 is a plunger spring stop 191. Stop 191 is provided with a circular detent 192. Compression spring 193 is mounted between projection 190 and stop detent 192 to urge plunger 188 out of passage 189. However, plunger 188 is held within passage 189 by means of stop ring 186A.

The forward end of plunger 188 is provided with a pointed projection 194 that contacts the end extension 195A of motor drive shaft 195. Shaft 195 is driven by supply roll motor 19.

Secured to the end of drive shaft 195 is a drive torque coupler 196. Formed on the outer end of bearing support member 186 is a roll coupler 197. Couplers 196 and 197 each have respectively one or more extensions 196' or 197' that will come into engagement with a corresponding complement extension on the other when rotational movement is applied in either direction to shaft 195. Thus, upon rotation of drive shaft 195, a coupler extension 196' of coupler 196 will come into contact with a corresponding extension 197' on roll coupler 197 so that roll tube 180 will be rotatably driven by shaft 195 through the couplers. Biased plunger 188 functions to maintain the couplers 196 and 197 in firm engagement with one another without interfering with the rotary driving of roll tube 180.

Bearing support member 186 is supported in roll sleeve bearing 198, which is supported in mount 190A which is part of side frame 142. Bearing support member 187 is supported at the other end of roll tube 180 in roll sleeve bearing 198A, which is supported in mount 202 which is part of side frame 140.

It should be noted that the bearing support members 186 and 187 may be supported in U-shaped or open ended bearings 198 and 198A in upwardly open mounts 190A and 202. In this manner, the entire supply roll tube 180 may be easily inserted with its coupler end positioned (intercoupling of couplers 196 and 197) into place on bearing 198 followed by insertion of the other end of roll tube 180 at support 187 on bearing 198A. Spherical end surface 204 will ride smoothly over the forward end with projection 194 based against threaded drive screw 208 due to the bias action of plunger 188. This arrangement eliminates any damage that might be caused to the actuator 166 upon insertion of the roll tube 180 onto bearings 198 and 198A.

Lateral translation drive means in the form of position actuator 166 comprises stepper motor 205 which is mounted on a frame plate 206 via bolts 213. The output shaft 207 of motor 205 secured to threaded roll drive screw 208. Screw 208 is provided with an external thread of predetermined pitch. An opening 210 is provided in side frame 140 into which is mounted an internally threaded bushing 211 and is secured to frame 140 by means of fasteners 212. Instead of using fasteners 212, bushing 211 may be press fitted in opening 210. Threaded bushing 211 has the same thread pitch as drive screw 208 so that upon rotational movement of motor shaft 207, the drive screw 208 will move laterally away from or against plug member 203 of roll tube 180 depending on the direction of rotation of motor shaft 207. In order to provide for this translatory motion, stepper motor 205 must be mounted to move with the tanslatory motion of drive screw 208. This is accomplished through movably mounted frame plate 206.

Frame plate 206 comprises a flat plate which is movably supported on four pin members 214 by bushings 206A, there being a bushing 206A at each plate corner. The pin members 214 are press fitted in corresponding openings 215 formed in side frame 140. Operation of motor 205 will cause movement of motor 205 with plate 206 along pin members 214 as well as translatory motion of drive screw 208 along the axis 199 of roll tube 180 so that the supply roll 18 can be positioned in the Y direction for lateral alignment of the medium 16 as it is fed into the recording station 12. This translatory motion can be applied to roll tube 180 independent of the rotational operation of the roll tube 180 by supply roll motor 19 via shaft 195 and the extended couplers 196 and 197.

Limit switch device 216 is mounted on side frame 140. Like devices 150 and 152, device 216 is provided with two optical sensor and light source pairs respectively at 217 and 218. A flag 220 is mounted on the top edge of frame plate 206. Upon continuous operation of stepper motor 205 in either direction, flag 220 will eventually intersect the light source beam to a respective sensor causing termination of the operation of motor 205 via medium guide servo control circuit 168. Thus, sensor/light source pairs 217 and 218 represent the maximum limits of translatory motion for actuator 166.

The respective outputs 211 and 222 of sensor/source pairs 217 and 218 are supplied as inputs to circuit 168. As previously indicated, optical edge sensor 170 has its output on line 167 connected to circuit 168.

Figure 4:
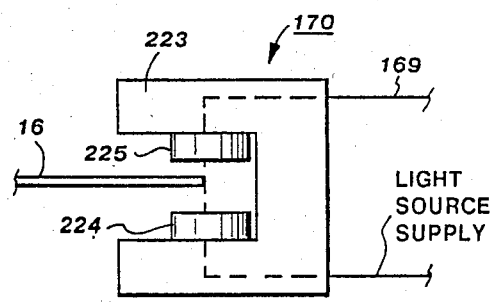
FIG. 4 is a section taken along the line of 4—4 of FIG. 3 showing a side view of the recording medium edge detector used with the lateral translation means of FIG. 3.

As shown in FIG. 4, sensor 170 comprises a U-shaped frame 223 with a light source 224 mounted on one leg of the frame in oppositely opposed relation to a photosensor 225 mounted on the other leg of frame 223. Sensor 170 is mounted relative to side frame 140. The sensor 170 is employed in a manner so that it is midway between a position wherein photosensor 225 detects full illumination from source 224, i.e., the medium 16 is not in the path of the light source 224 and a position wherein photosensor 225 is completely blocked off from the illumination from source 224, i.e., the medium 16 is completely in the path of the light source 224.

Circuit 168 performs to basic functions: an optical sensor interface and stepper motor control. These functions are described in further detailed in connection with FIG. 5. In general, the operation of stepper motor 205 is such that upon activation via circuit 168, motor 205 is driven to translate roll tube 180 to the inner maximum limit until flag 220 intersects the light beam of sensor/source pair 217 which stops the operation of motor 205. Motor 205 is then operated a predetermined amount in the opposite direction to the proximate midpoint wherein the edge of medium 16 is halfway over photosensor 225. At this point, flag 220 is about half way between pairs 217 and 218. The sensor interface of circuit 168 includes a comparator having one input via lead 167 from photosensor 225 and another input from a voltage reference, $V_{REF}$. $V_{REF}$ represents in electrical quantity, the coarse Y position desired for medium 16. The voltage value from photosensor 225 via line 169 is compared with $V_{REF}$ to determine if stepper control should be activated to readjust the position of tube 180 along the Y direction and reposition the medium edge as the medium is being paid off of supply roll 18. As an example, the magnitude of adjustment of roll translation may be plus or minus 10 mils. Stepper motor provides 240 steps revolution of its output shaft. If the thread pitch of drive screw 208 is 10 turns per inch, then one revolution of the output of motor 205 comprises about 2000 steps per inch and each step of motor 205 is a 0.5 mil translatory step.

Figure 5:
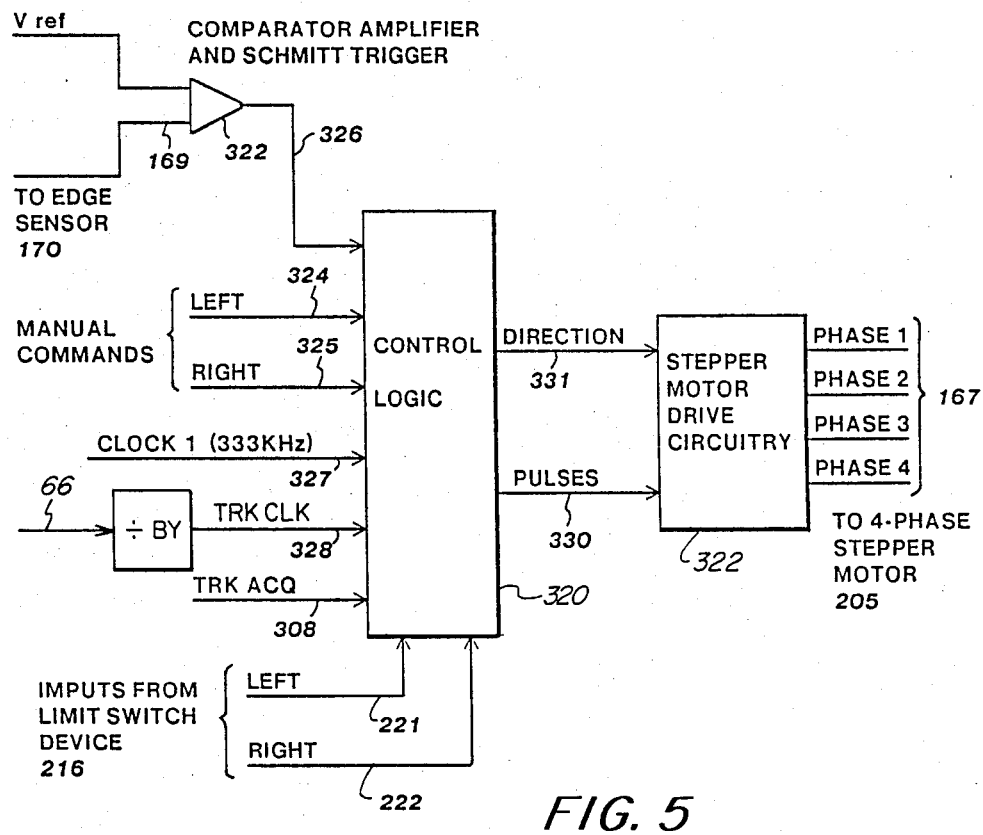
FIG. 5 is a circuit diagram for the medium guide servo control in FIGS. 1 and 3 to provide lateral translation of the recording medium roll.

Reference is now made to FIG. 5 which shows in more detail the sensor interface and stepper control 168 of FIG. 3. The sensor interface comprises control logic 320 that is conventional circuitry designed to interpret its inputs in a conventional manner to provide velocity via line 330 and direction indication via line 331 to conventional stepper motor drive circuitry 322. Logic 320 has two manual inputs. There are the manual command left and right inputs 324 and 325 which permit manual operation of stepper motor 205 whereby an operator is permitted to manually initialize the lateral translation and position of supply roll 18. Input 327 is the general logic clock input.

The input 328 to control logic 320 is the tracking clock signal, TRK CLK, comprising the signal from the medium tracking encoder 62 via line 66 and divided-by circuit 329. The output on line 328, therefore, represents a pulse train output proportional to the pulse output of encoder 66 monitoring medium movement. Input signal, TRK CLK, permits determination by control logic 320 of the correct rate of application of stepper motor pulses on line 330 to stepper motor drive circuitry 322 based upon the then rate or velocity of medium movement. In this manner, the amount of lateral translation correction is applied to the then portion of the moving recording medium under examination by sensors 170 and 170' and directly applicable to the determined correction amount.

Input 308, termed TRK ACQ, is an enablement input to control logic 320 to commence the sensing functions relative to medium position and provide lateral adjustment of supply roll 18 as explained in connection with FIG. 3.

The inputs 221 and 222 from the limit sensor device 216 mounted on frame 140 are also inputs to control logic 320.

As mentioned relative to FIG. 4, the optical edge sensor 225 produces a signal that is proportional to the amount of coverage of medium 16 over the sensor detection surface as compared to the amount of coverage off of the medium edge and exposed to light source 224. The proper edge position for medium 16 can therefore be proportional to a predetermined voltage value on line 167 which can be set to the voltage value for $V_{REF}$. The set value for $V_{REF}$ is compared with the voltage appearing on line 167 in comparator 332 which also includes comparator amplifier and Schmitt like trigger. Comparator 332 provides an hysteresis operating effect which is representative of a "deadband" of operation for stepper motor 205 so that the motor will not be placed in a "chatter mode", i.e., alternately stepped in one direction and then the other in a continuous manner. The output 326 of comparator 322, therefore, is a logic value of either are binary "0" or "1" indicative of the magnitude of the difference between sensor input 167 and $V_{REF}$ as well as whether the value for input 167 was higher or lower than the representative value for $V_{REF}$. These values are interpreted by control logic 320 in a conventional manner into drive pulses for motor 205 drive circuitry 322, the value of which is proportional to the magnitude of offset from $V_{REF}$. Also, the amount of sensor coverage indicates which direction the motor drive circuitry 322 should drive motor 205. Logic 320 is conventional configured logic used for such optical sensor applications to determine direction and magnitude and comprises AND/OR gate logic and two flip flops to hold the state of various input signals and interpret the signal sequence. The stepper motor drive circuitry 322 is conventional and comprises a high current driver having a four phase output to operate the unipolar four phase stepper motor 205. The four phase output is necessary for direction control of motor 205.

As previously explained relative to description of FIG. 3, the limit sensor 216 provides for maximum limits of operation on motor 205 and provides a starting or initialized position for lateral roll translation above that achievable through line-of-site positions of the medium translation via inputs 324 and 325.

Figure 6:
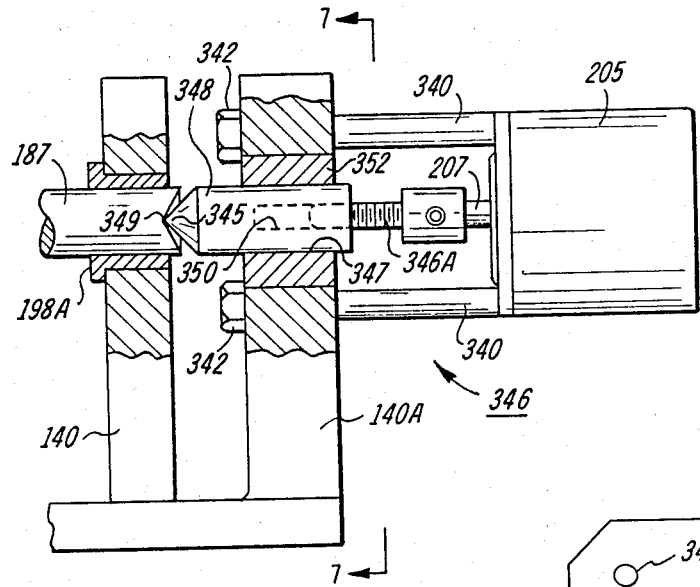
FIG. 6 is an alternative embodiment of lateral translation drive means shown in FIG. 3.
Figure 7:
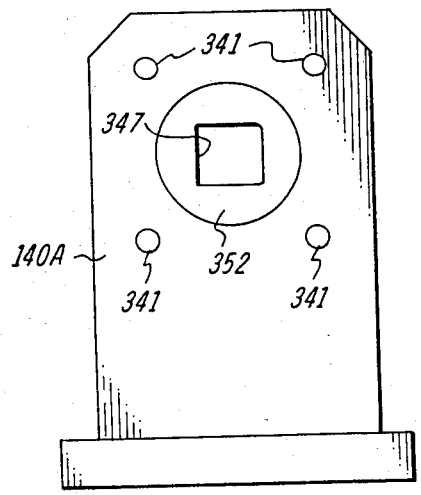
FIG. 7 is a view taken along the line 7—7 of FIG. 6.

Reference is now made to FIGS. 6 and 7 wherein there is disclosed alternative embodiment for the lateral translation drive means. Actuator 346 comprises stepper motor 205 secured to side frame member 140A by means of bolts 342 inserted through respective openings 341 in member 140A (FIG. 7) and secured in corresponding threaded openings provided in the ends of support legs 340 of motor 205. Bushing 352 is press fitted into an opening provided in member 140A and is provided with a square opening 347, as seen in FIG. 7. This square opening is adapted to receive a corresponding square shaped plunger 348 which is slidably movable within the opening 347 of bushing 352. Plunger 348 has a forward pointed end 349 for contact in the indention 345 provided on the outer end of support member 187. Secured to motor shaft 207, via an appropriate coupling, is a threaded shaft member 346A for engagement with complementary threaded opening 350 provided in the rearward end of plunger 348.

Actuator 346 differs primarily from actuator 166, in that motor 205 in the case of actuator 166 is movable with rotational translation of the thread drive screw 208, while in the case of actuator 346, motor 205 is fixed and translational movement is provided with rotational translation of the plunger 348 via threaded shaft member 346 and complementary threaded opening 350 in plunger 348.

Figure 8:
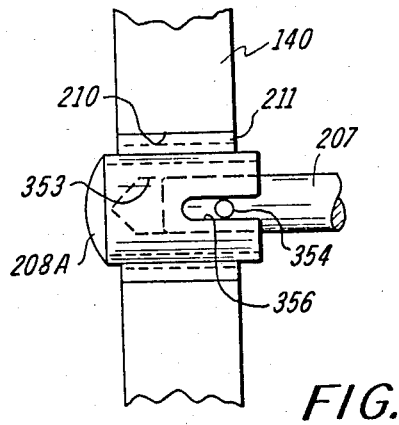
FIG. 8 is an alternative embodiment for the translation output means illustrated in FIG. 3 wherein the drive motor is stationary mounted as in the case of FIG. 6.

FIG. 8 illustrates an alternative embodiment for translation output means for the threaded drive screw 208 of FIG. 3 while permitting stepper motor 205 to be mounted in a fixed position as shown in FIG. 6. As in the case of drive screw 208 in FIG. 3, threaded roll drive screw 208A is provided with an external thread of predetermined pitch. An opening 210 is provided in side frame 140 into which is mounted an internally threaded bushing 211 and is secured to frame 140 by means of being press fitted in opening 210. Threaded bushing 211 has the same thread pitch as drive screw 208A so that upon rotational movement of motor shaft 207, the drive screw 208A will move laterally away from or against plug member 203 of roll tube 180 (FIG. 3) depending on the direction of rotation of motor shaft 207.

In order to provide for this translatory motion, with stepper motor 205 being fixed relative to frame 140 such as illustrated in FIG. 6, the end of shaft 207 is slidably movable within a corresponding opening 353 provided in the rearward end of drive screw 208A. One side of opening 353 is provided with an elongated slot 356. A drive pin 354, secured to motor shaft 207 near the end thereof, translates rotary motion to drive screw 208A while moves along slot 356 with the translatory motion of drive screw 208A upon rotation of shaft 207 by motor 205.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A laterally translatable roll apparatus for supply and/or take-up of a continuous web of material to maintain said roll in proper alignment as the web is paid from or rewound onto said roll, comprising:
   a pair of frame members;
   a roll for supporting said continuous web of material;
   means on said frame members to rotatably support said roll therebetween, said support means comprising open ended bearing support means;
   roll drive means having a drive shaft extending to one end of said roll;
   interengagable coupler means on the output end of said roll drive shaft and said roll one end to permit said roll to be rotatably driven by said roll drive shaft while allowing for immediate lateral disengagement of said coupler means upon removal of the other end of said roll from said open ended bearing support means;
   means axially mounted at said roll one end and biased to move axially outward away therefrom for engagement against said drive shaft output end;
   lateral translation drive means mounted on the other of said frame members with translation output means engaging in axially aligned, abutting contact relation the other end of said roll,
   said axially aligned, abutting contact relation to permit disengagement of said roll other end from said translation output means by singularly lifting said roll other end from its open ended bearing support means while not interfering either with the lateral operation or rotational operation of said roll when said roll is positioned for said operations in said open ended bearing support means;
   control means to operate said lateral translation drive means to translate said lateral output means.

2. The laterally translatable roll apparatus of claim 1 wherein said lateral translation drive means comprises:
   a stepper motor mounted on said other frame member with its drive shaft in axial alignment with the rotational axis of said roll;
   said stepper motor mounted for movement along the rotational axis of said roll toward and away from said other frame member;
   said translation output means comprising a drive screw threadably mounted in said other frame member in axial alignment with said rotational axis and having one end secured to the output end of said stepper motor drive shaft.

3. The laterally translatable roll apparatus of claim 2 wherein said control means comprises:
   circuit means connected to said stepper motor to drive said stepper motor in either direction based upon signals comprising two inputs to said circuit means;
   an optical edge sensor mounted at the edge of said web as the same is paid from said roll and productive of a voltage signal indicative of the amount of coverage of said sensor by said web edge, said voltage signal one of said inputs to said circuit means;
   a voltage reference source providing a voltage reference signal representative of the desired lateral position of said web as the same is paid from or rewound onto said roll, said voltage reference signal being the other of said inputs to said circuit means;
   comparator means in said circuit means to compare said inputs and produce a signal indicative of the amount of incremental steps to be taken by said stepper motor.

4. The laterally translatable roll apparatus of claim 1 wherein said axially mounted biased means is a spring loaded plunger mounted in said roll one end.

5. The laterally tanslatable roll apparatus of claim 1 wherein said lateral translation drive means comprises:
   a stepper motor mounted on said other frame member with its drive shaft in axial alignment with the rotational axis of said roll;
   said translation output means comprising a drive screw slidably mounted in said other frame member in axial alignment with said rotational axia and having one end thereof threadably driven by the output end of said stepper motor drive shaft.

6. The laterally translatable roll apparatus of claim 5 wherein said control means comprises:
   circuit means connected to said stepper motor to drive said stepper motor in either direction based upon signals comprising two inputs to said circuit means;
   an optical edge sensor mounted at the edge of said web as the same is paid from said roll and productive of a voltage signal indicative of the amount of coverage of said sensor by said web edge, said voltage signal one of said inputs to said circuit means;
   a voltage reference source providing a voltage reference signal representative of the desired lateral position of said web as the same is paid from or rewound onto said roll, said voltage reference signal being the other of said inputs to said circuit means;
   comparator means in said circuit means to compare said inputs and produce a signal indicative of the amount of incremental steps to be taken by said stepper motor.

7. In an electrographic printer of plotter system, a laterally translatable roll apparatus for lateral translation of a recording medium as the medium is paid from or rewound onto a medium roll to properly align the medium for movement through one or more stations comprising said system, said roll apparatus comprising:
   a pair of frame members;
   a roll for supporting said continuous web of said recording medium;
   means on said frame members to rotatably support said roll therebetween, said support means comprising open ended bearing support means;
   roll drive means having a drive shaft extending to one end of said roll;
   interengagable coupler means on the output end of said roll drive shaft and said roll one end to permit said roll to be rotatably driven by said roll drive shaft while allowing for immediate lateral disengagement of said coupler means upon removal of the other end of said roll from said open ended bearing support means;
   means axially mounted at said roll one end and biased to move axially outward away therefrom for engagement against said drive shaft output end;
   lateral translation drive means mounted on the other of said frame members with translation output means engaging in axially aligned, abutting relation the other end of said roll
   said axially aligned, abutting contact relation to permit disengagement of said roll other end from said translation output means by singularly lifting said roll other end from its open ended bearing support means while not interfering either with the lateral operation or rotational operation of said roll when said roll is positioned for said operations in said open ended bearing support means;

control means to operate said lateral translation drive means to translate said lateral output means.

8. In the electrographic printer or plotter system of claim 7 wherein said lateral translation drive means comprises:

a stepper motor mounted on said other frame member with its drive shaft in axial alignment with the rotational axis of said roll;

said stepper motor mounted for movement along the rotational axis of said roll toward and away from said other frame member;

said translation output means comprising a drive screw threadably mounted in said other frame member in axial alignment with said rotational axis and having one end secured to the output end of said stepper motor drive shaft.

9. In the electrographic printer or plotter system of claim 8 wherein said control means comprises:

circuit means connected to said stepper motor to drive said stepper motor in either direction based upon signals comprising two inputs to said circuit means;

an optical edge sensor mounted at the edge of said web as the same is paid from said roll and productive of a voltage signal indicative of the amount of coverage of said sensor by said web edge, said voltage signal one of said inputs to said cicuit means;

a voltage reference source providing a voltage reference signal representative of the desired lateral position of said web as the same is paid from or rewound onto said roll, said voltage reference signal being the other of said inputs to said circuit means;

comparator means in said circuit means to compare said inputs and produce a signal indicative of the amount of incremental steps to be taken by said stepper motor.

10. In the electrographic printer or plotter system of claim 7 wherein said axially mounted biased means is a spring loaded plunger mounted in said roll one end.

11. In the electrographic printer or plotter system of claim 7 wherein said lateral translation drive means comprises:

a stepper motor mounted on said other frame member with its drive shaft in axial alignment with the rotational axis of said roll;

said translation output means comprising a drive screw slidably mounted in said other frame member in axial alignment with said rotational axis and having one end thereof threadably driven by the output end of said stepper motor drive shaft.

12. In the electrographic printer or plotter system of claim 11 wherein said control means comprises:

circuit means connected to said stepper motor to drive said stepper motor in either direction based upon signals comprising two inputs to said circuit means;

an optical edge sensor mounted at the edge of said web as the same is paid from said roll and productive of a voltage signal indicative of the amount of coverage of said sensor by said web edge, said voltage signal one of said inputs to said circuit means;

a voltage reference source providing a voltage reference signal representative of the desired lateral position of said web as the same is paid from or rewound onto said roll, said voltage reference signal being the other of said inputs to said circuit means;

comparator means in said circuit means to compare said inputs and produce a signal indicative of the amount of incremental steps to be taken by said stepper motor.

* * * * *